United States Patent

Flesch

[15] 3,667,520

[45] June 6, 1972

[54] WEIGHT CONTROLLED SLICING SYSTEM INCLUDING GROSS ERROR DETECTING MEANS

[72] Inventor: Keith E. Flesch, Garrett, Ind.
[73] Assignee: Peter Eckrich & Sons, Inc.
[22] Filed: Dec. 14, 1970
[21] Appl. No.: 97,590

[52] U.S. Cl. .......................................................... 146/94 R
[51] Int. Cl. .................................................................. B26d 4/56
[58] Field of Search ............ 146/94 R, 94 C, 222, 110, 113 R

[56] References Cited

UNITED STATES PATENTS 3,379,234  4/1968  Kasper ................................. 146/94 R
3,508,591  4/1970  Johnson et al. ....................... 146/94 R Primary Examiner—Willie G. Abercrombie
Attorney—Hofgren, Wegner, Allen, Stellman & McCord

[57] ABSTRACT

A slicer control system of the type for use in slicing operations wherein a predetermined number of slices are cut from a length of material and are intended to have a predetermined weight. The exemplary embodiment employs a slice receiver which receives slices as they are cut and a take-away conveyor for removing slices from the slice receiver after a predetermined number of slices are cut. The invention further includes a weight monitoring system for comparing the weight of the slices cut against a predetermined standard to prematurely actuate the take-away conveyor when a predetermined error exists even though the predetermined number of slices have not yet been cut to minimize the number of groups of slices having gross errors and ultimately require rejection for weight deviation from a standard.

10 Claims, 2 Drawing Figures

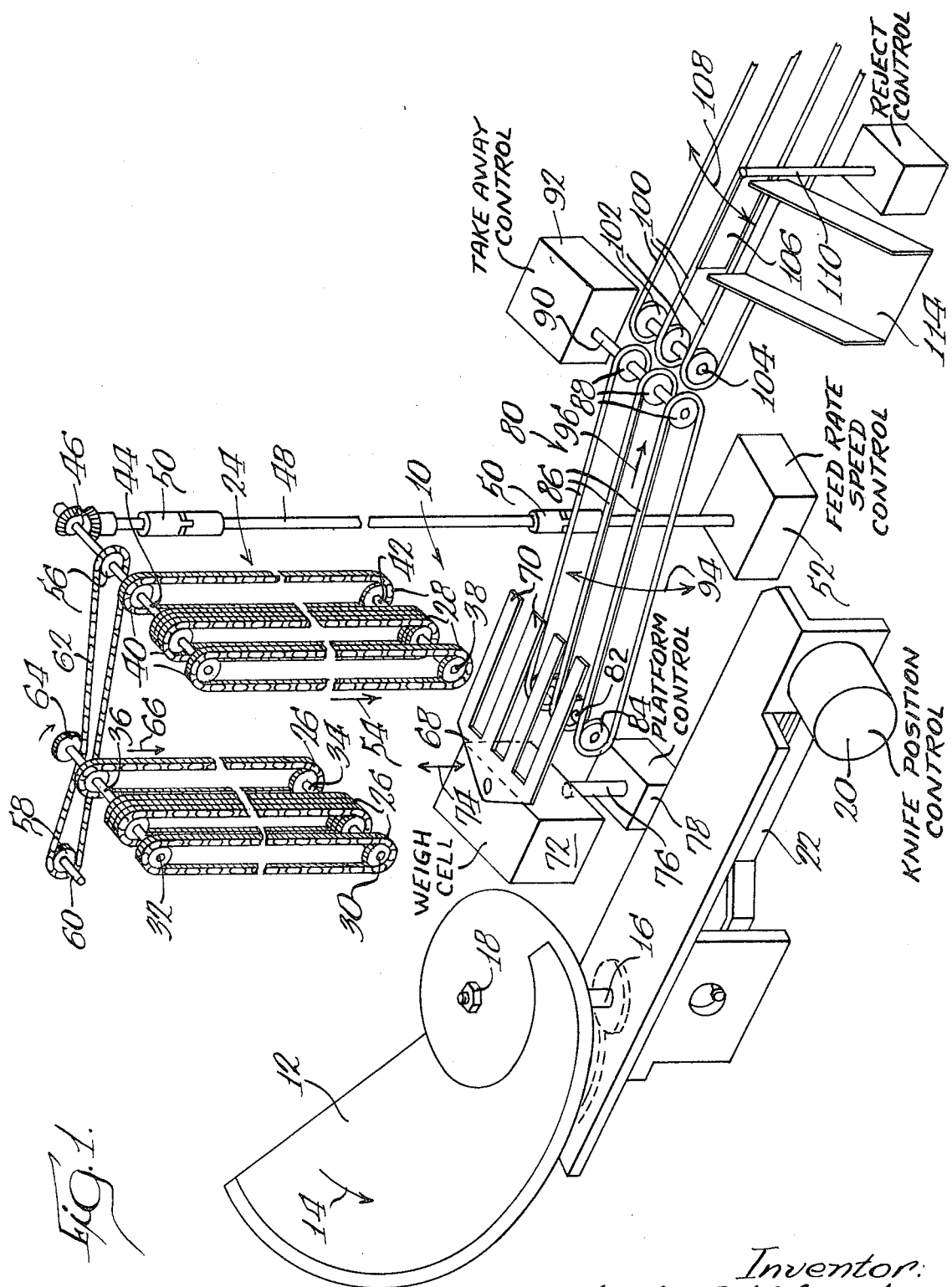

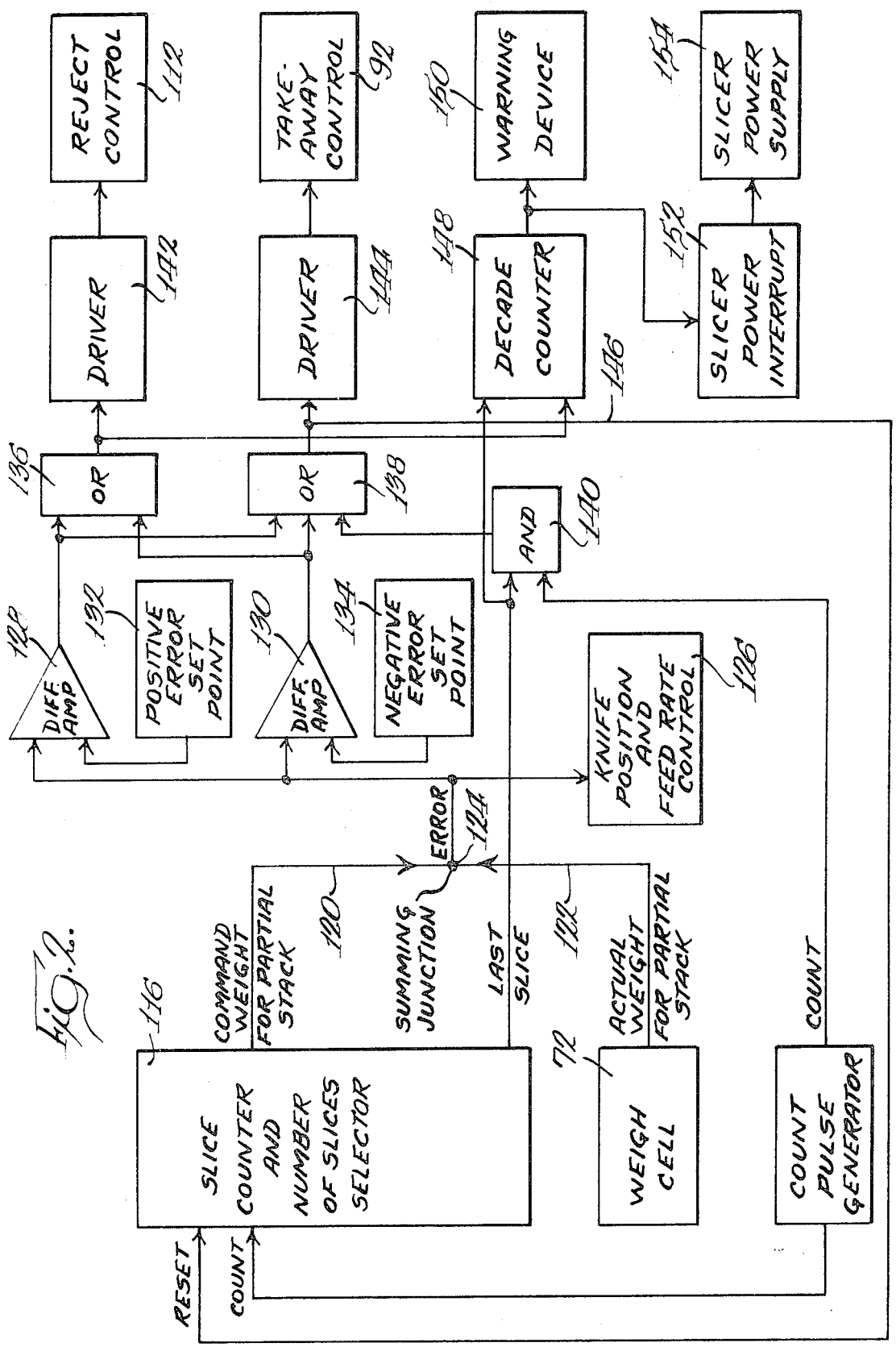

WEIGHT CONTROLLED SLICING SYSTEM INCLUDING GROSS ERROR DETECTING MEANS

BACKGROUND OF THE INVENTION

Because of the relatively strict regulation of the food industry with respect to labeling practices, food producers have historically put more food in a container than stated on the label in order to insure that the great majority of containers will have at least the stated weight of food contained therein. The excess of food actually in the container over and above that stated to be contained therein is termed "give-away" in view of the fact that the consumer pays for a package having the stated weight of food contained therein but in reality will normally receive somewhat more food.

While the amount of "give-away" in a typical container is generally nominal in terms of the percentage of the stated weight, those skilled in the art are well aware of the fact that over a period of a year, the cost of such "give-away" to a given food producer will be substantial. Thus, every effort is made to minimize the amount of "give-away" and yet maintain a required percent of packages at a weight equal to or above the stated weight within the regulations of the appropriate governing body.

One area in which extensive effort has been expended to minimize "give-away" is in the marketing of multiple slice food packages containing such food stuffs as cheese and meat products such as sandwich meat. Most of the efforts have centered about the slicing operation and the average weight controlled slicing system reduces "give-away" to an average of about 3 percent. In one recently proposed system, the average "give-away" has been reduced to about 1 percent. This system is that disclosed in the commonly assigned, copending application of Lambert et al. entitled "Slicer Control System," Ser. No. 819,017, filed Apr. 24, 1969, now U.S. Pat. No. 3,605,837.

The Lambert et al. system is specifically designed for slicing loaf-type products such as sandwich loaves and while extremely successful in accomplishing its intended purpose, the same fails to provide for those situations that can occur when a feeding means for feeding a loaf into a slicing area "drops" the heel of the loaf or when there is a large void in the loaf thus severely changing the density of the loaf at one point therein.

In such cases, the deviation in actual slice weight from the desired slice weight is so extreme that the system cannot compensate for the error in the cutting of further slices or the slices are so non-uniform that they are not commercially salable.

In the Lambert et al. system, when a heel drops or an extreme void is encountered, the system will continue to slice the preset number of slices to go into a package quite needlessly because the package will require manual handling to remove the bad slice or heel from the package. That is, for one extremely bad slice in a package of, say, eight slices, all eight slices will require manual handling and such manual handling materially increases the cost of the slicing operation particularly when considered over the relatively long period of time. This invention therefore directs itself to the reduction of manual handling requirements in such instances.

SUMMARY OF THE INVENTION

It is the principal object of the invention to provide a new and improved weight controlled slicing system for use in the slicing of plural slice stacks which will minimize manual handling required for stacks that grossly deviate from the desired standard due to extreme voids in a slice, extreme nicks in a slice or the dropping of a loaf heel onto the stack.

The exemplary embodiment of the invention achieves the foregoing objects through the provision of a means for determining when a gross error of a predetermined magnitude exists and for prematurely interrupting a stack cutting cycle. In particular, there is provided a slice receiving means which receives each slice as it is cut by a knife operating in a cutting area into which the material to be sliced is fed by a feeding means. Each time a slice is added to the stack accumulating on the slice receiving means, the weight of the partial stack is compared against a preset standard for the partial stack weight and if the actual stack weight deviates from the preset standards by a given percentage, a take-away conveyor, normally operative to remove each stack of slices after the completion of cutting of each stack, is prematurely energized to remove the partial stack and reset the apparatus to begin the cutting of the next stack of slices. The prematurely taken away stack of slices is then led to a rejection mechanism which rejects the same to an area designated for receiving slices to be manually handled.

Because the vast majority of rejected stacks will not contain the full number of slices desired for the stack due to the premature operation of the take-away means, a considerably lesser number of slices require manual handling.

Other objects and advantages of the invention will become apparent from the following specification taken in conjunction with the accompanying drawings.

DESCRIPTION OF THE DRAWINGS

FIG. 1 is a mechanical schematic illustrating a weight controlled slicing system made according to the invention; and FIG. 2 is a block diagram of an electrical control system employed in the system.

DESCRIPTION OF THE PREFERRED EMBODIMENT

With reference to FIG. 1, an exemplary embodiment of the weight controlled slicing system made according to the invention is seen to include a cutting area, generally designated 10 through which a rotary knife 12 is moved in a direction indicated by an arrow 14. The knife 12 is mounted for rotation with a drive shaft 16 and retained thereon by means of a nut 18. By means of a knife position control motor 20 operating through a linkage 22, the vertical position of the shaft 16 may be controlled to control the position of the knife 12 within the cutting area 10.

Located above the cutting area 10 is a feeding means, generally designated 24, which is operative to drive a loaf or the like into the cutting area 10 to be cut by the knife 12 as the latter passes therethrough. The feeding means 24 consists of two sets of chains 26 and 28, respectively, which engage the loaf on opposite sides thereof to grip the same. The chains 26 are trained about a vertically spaced set of sprockets 30 and 32 with the sprockets 30 being mounted on an idler shaft 34 and the sprockets 32 being mounted on a driven shaft 36. Similar sets of sprockets 38 and 40 are associated with the chains 28 with the sprockets 38 being mounted on an idler shaft 42 and the sprockets 40 being mounted on a driven shaft 44. The driven shaft 44 is connected through a set of bevel gears 46 to a shaft 48 including couplings 50 to a feed rate speed control unit 52. The rotation of the shaft 48 is such that the same imparts rotation to the shaft 40 in a direction so that the run of the chains 28 facing the chains 26 is driven downwardly in the direction indicated by an arrow 54.

The shaft 40 also mounts a sprocket 56 which, in conjunction with a sprocket 58 mounted on an idler shaft 60 mount a drive chain 62 which passes under a sprocket 64 on the driven shaft 36. The sprockets 56 and 64 have the same pitch diameter, and as a result, the shaft 36 will be rotated in a direction opposite the direction of rotation of shaft 44 so that the runs of the chains 26 facing the chains 28 will also be driven downwardly in the direction of an arrow 66 at the same speed as the facing runs of the chains 28 to provide a positive feed of a loaf interposed and gripped therebetween.

Below the cutting area 10 and positioned to receive slices cut from a loaf being fed by the feeding means 24 is a slice receiving platform 68 having a plurality of tines 70. The platform 68 is mounted on a conventional weigh cell 72 which in turn is mounted for up and down movement in a direction of an arrow 74 on a shaft 76 associated with a platform position control means 78. The platform position control means 78 is operative to progressively lower the platform 68 as a stack is being cut at a rate equal to the desired thickness of a slice per the amount of time required to cut a slice. For example, when the first slice in a stack is to be cut, the platform 68 will be at its uppermost position while when the seventh slice in a stack is to be cut, the upper surface of the sixth slice of the stack resting on the platform 68 will be approximately at the uppermost position of the platform.

The weigh cell 72 determines the weight of the number of slices resting on the platform 68 at any given time and provides an output signal having a magnitude proportional to the stack weight.

The system further includes a take-away conveying means, generally designated 80, including an idler shaft 82 mounting a plurality of sheaves 84 about which belts 86 are trained. The spacing between the sheaves 84 is such that the upper runs of the belts 86 can be moved between the tines 70 of the platform 68.

The belts 86 are also trained about sheaves 88 mounted on a driven shaft 90 operatively associated with a take-away control system 92. By means of a frame not shown, the shaft 82 and the sheaves 84 thereon, and thus the upper runs of the belts 86, may be pivoted in the direction of an arrow 94 about the axis provided by the shaft 90 in such a way that the upper runs of the belts 86 pass through the tines 70 and above the upper surface of the platform 68 so as to engage slices resting on the latter. Further, by means of a motor (not shown) associated with the take-away control 92, rotary motion is imparted to the shaft 90 in such a way as to drive the upper runs of the belts 86 in the direction of an arrow 96 to move the slices off of the platform 68 when the upper runs of the belts 86 engage the lowermost slice in the stack.

Thus far, the structure and system described is that shown in the above-identified Lambert et al. application, the disclosure of which is herein incorporated by reference; and reference may be had thereto for a more detailed statement of the structure comprising the various elements.

The mechanical structure is completed by a second set of conveying belts which have one end trained about respective sheaves 102 mounted on a shaft 104. By any suitable means, the upper runs of the belts 100 are driven in the same direction as the upper runs of the belts 86 so as to receive a stack of slices from the belts 86 and convey the same for further processing. According to one embodiment of the invention, there may be provided a reject control shown schematically as a paddle 106 mounted for movement in the direction of an arrow 108 by means of a shaft 110 operatively associated with a rejection control system 112. Also associated with the paddle 106 is a chute 114 or the like.

When it is desired to reject a stack of slices, the rejection control system 112 is actuated to rotate the shaft 110 in such a way as to locate the paddle 106 across the upper runs of the belts 100 so that a stack of slices will engage the same and be deflected thereby into the reject chute 114. Control of the reject control system 112 may be accomplished by means of a comparison of the actual slice weight as determined by the weigh cell with the predetermined standard, with operation of the reject control system 112 occurring when a predetermined deviation exists. The weigh cell used to provide such control can be the weigh cell 72 if the rejection mechanism is located sufficiently close to the cutting zone or if a memory is provided to remember the particular stack in a string of stacks running along the conveyors to be rejected. Alternatively, and more conventionally, a weigh cell separate from the weigh cell 72 may be associated with the conveying system to operate the reject control system 112.

Turning now to FIG. 2, the block diagram of the control system for the slicing system is shown and may embody electromechanical devices such as those disclosed in the above-identified Lambert et al. application or, more preferably, the electronic counterparts of the electromechanical devices disclosed therein. In particular, there is provided a slice counter and a number of slices selector 116 which may be preset to the desired number of slices in a stack and further receives information from a "count" pulse generator 118 operative each time a slice has been cut. According to the preferred embodiment of the invention, the number of slices selector may merely comprise a manually operable electrical tap into a multiple bit ring counter which is stepped each time a slice is cut by the count pulse generated by the count pulse generator 118. Associated with the ring counter is a digital to analog conversion matrix which is arranged so that for each count contained in the ring counter, a command weight signal for the partial stack will be issued. For example, if a scaling factor of 1 volt per ounce is employed and the desired weight per each slice is 1 ounce, after four slices have been cut, a 4 volt signal of a particular polarity will be placed on a line 120 as the command weight signal. (In actuality, a slightly larger voltage will be applied to the line 120 for the reasons set forth in the Lambert et al. application.)

The control system further includes the weigh cell 72 which provides an actual weight signal on a line 122 which is connected to the line 120 at a summing junction 124. The signal placed on he line 122 will have a polarity opposite of that of the signal placed on the line 120 and, as a result, at the summing junction 124, there will be a voltage equal to the error between the commanded weight and the actual weight. The error signal from the summing junction 124 is then fed to a knife position and feed rate control system 126 embodying the feed rate speed control system 52 and the knife position control 20 to cause adjustment of both feed rate and knife position to eliminate the errors in the manner described in the Lambert et al. application.

More particularly, the error signal is fed to the knife position control 20 to effect an immediate change in the position of the knife 12 within the cutting area 10 so that the next slice cut will bring the actual partial stack weight up to the standard partial stack weight. For example, if the actual partial stack weight is under the desired partial stack weight for that number of slices, the knife will be moved towards the feeding means so that a thicker slice will be cut on the next cycle, the amount of such movement being governed by the magnitude of the error signal. On the other hand, if the actual partial stack weight is greater than the predetermined partial stack weight for that number of slices, the knife will be moved away from the feeding means so that a thinner slice will be cut on the next cycle to bring the actual partial stack weight into conformance with the desired standard partial stack weight. Similarly, an adjustment will be made in the feed rate, the magnitude of the adjustment being dependent upon the magnitude of the error signal. If the partial stack is underweight, the feed rate will be increased while if the partial stack is overweight, the feed rate will be retarded.

As pointed out in the Lambert et al. application, the knife adjustment effects an immediate, one cycle correction while the feed rate adjustment effects a long-range correction and the two work in concert to minimize the total error in stack weight enabling a minimum give-away, normally no more than about 1 percent.

The error signal at the junction 124 is also applied as an input to a pair of differential amplifiers 128 and 130, respectively. Associated with the differential amplifier 128 is a positive error set point control 132 while a negative error set point control 134 provides a similar input to the differential amplifier 130. The set point controls 132 and 134 may be suitably adjusted to set the percent of error represented by the error voltage at the summing junction 124 required to cause the respective differential amplifiers 128 and 130 to issue output signals for purposes to be seen. According to one embodiment of the invention, the set point controls 132 and 134 may be set to detect a 15 percent error in the nominal weight of one slice. If so set, and the scaling factor mentioned previously were employed, after four slices are cut, if the actual weight signal on the line 122 were to be less than 3.85 volts, the differential amplifier 130 would issue its output signal while if the actual weight signal on the line 122 were in excess of 4.15 volts, the differential amplifier 128 would issue its output signal. In other words, one or the other of the differential amplifiers 128 and 130 provides an output signal whenever the actual partial stack weight differs from the commanded partial stack weight by an amount equal to 15 percent of the nominal weight of one slice. Of course, error percentages other than 15 percent can be used if desired.

The outputs from the differential amplifiers 128 and 130 are taken to each of two OR gates 136 and 138 with the OR gate 138 further receiving an input from an AND gate 140.

The OR gate 136 in turn is connected to a driver 142 which is operative to energize the reject control system 112 in response to the sensing of a predetermined gross error by either the amplifier 128 or the amplifier 130. The OR gate 138 is connected to a similar driver 144 for the take-away control system 92 to cause upward movement of the belts 86 to engage slices on the platform 68 and remove the same therefrom. In this respect, it will be noted that the take-away control 92 may be energized whenever the OR gate 138 receives a signal from either one of the amplifiers 128 and 130 indicating a gross error without regard to the desired number of slices to comprise a stack or the number of slices then cut. That is, through the just-described system, the take-away control 92 can be operated prematurely and before the predetermined number of slices to be in each stack have been cut when a predetermined gross error exists.

In order to actuate the take-away control 92 in the normal manner, the AND gate 140 can provide an appropriate signal to the OR gate 138 when the last slice in a stack is cut. In this respect, the AND gate 140 includes a first input from the slice counter and number of slices selector 116 on which a last slice signal may be received. The last slice signal may be generated when the particular bit in the ring counter forming a portion of the slice counter and number of slices selector 116 in the position corresponding to the number of slices selected is set in response to a count signal from the count pulse generator. Additionally, the AND gate 140 includes an input from the count pulse generator on which a count signal may be received for timing purposes. Accordingly, when the count signal is generated by the count pulse generator 118, and if the same results in the generation of a last slice signal, the AND gate 140 will ultimately cause energization of the take-away control. However, if the last slice signal is not present during the count signal which will normally be the case, the only way that the take-away control 92 can be energized is by virtue of the sensing of the gross error in the manner mentioned previously.

A line 146 is connected from the output of the OR gate 138 as an input to the slice counter and number of slices selector 116 for reset purposes. That is, the arrangement is such that whenever the OR gate 138 receives an input signal, the ring counter forming a portion of the slice counter and number of slices selector 116 will be reset in readiness for the initiation of the cutting of the next stack of slices. It will therefore be seen that whenever the predetermined number of slices in a stack has been cut as evidenced by the output of the AND gate 140 or whenever a partial stack grossly deviates from the commanded stack weight as evidenced by output signals from one or the other of the differential amplifiers 128 and 130, the system will be reset.

The system is completed by a decade counter 148 connected to receive a stepping input from the OR gate 136 and a resetting input from the output line of the slice counter and number of slices selector 116 on which the last slice signal is issued. When the decade counter has been stepped a predetermined number of times, it will issue an output signal to a warning device 150 and/or to a slicer power interrupt circuit 152. The latter may comprise a driver for a relay in the slicer power supply circuit 154.

The purpose of the foregoing is to shut down the slicing system if a predetermined number of consecutively produced partial stacks are in gross deviation from any desired partial stack weight. The operation is as follows. Each time a gross error is detected, the OR gate 136 issues an output signal indicative of the fact and this signal is used to step the counter 148. After a predetermined number of such signals have been received, indicating that a number of consecutive partial stacks grossly deviate from the desired weight, the decade counter will have been stepped to the predetermined number at which time it will issue an output signal to energize the warning device 150 and notify the operator of the slicing system that there is a persistent malfunction. At the same time, the decade counter 148 will energize the slice power interrupt circuit 152 which in turn will break the connection of the slicer to its power supply 154 to shut down the system.

If only occasionally there is a rejection, when such occurs, the decade counter will be stepped. However, the next time a full stack is cut, the issuance of the last slice signal will result in the decade counter being reset before it can be stepped to the predetermined number. As a result, occasional gross errors are handled in the manner described previously while persistent ones are counted to alert the operator to that fact so that appropriate corrective measures may be taken.

From the foregoing, it will be appreciated that the invention provides a means of reducing the number of slices that must be handled manually in a slicing and packaging operation. For example, if eight-slice packages are to be cut, and a gross error exists after the cutting of the second slice due to an unusually large void or the dropping of a heel or the like, ultimately only two slices will require manual handling whereas previous systems would require the manual handling of eight slices. And while the invention has been described in conjunction with the system disclosed in the above-identified Lambert et al. application wherein actual partial stack weight is compared with commanded partial stack weight information, it will be recognized that the same could be employed in other systems as, for example, those wherein a predicted final stack weight is computed and the weight error determined therefor. Furthermore, it will also be recognized that while in the exemplary embodiment premature operation is based on a percentage error of the nominal weight of one slice, the invention could be efficaciously employed in a system wherein the error as a percentage of a total partial stack weight would be sensed.

I claim:

1. In a slicing system including a knife for cutting slices from one end of a length of material to be fed into a cutting zone, a feeding means for feeding material into the cutting zone to be sliced by the knife, a means for receiving slices cut from the length of material by the knife, intermittently operable take-away conveying means adapted to be operated to remove cut slices from the receiving means, and a slice counting means operable to actuate the take-away conveyor after a predetermined number of slices have been cut, the improvement which comprises: means for continuously monitoring the weight of the slices received by said receiving means and for comparing the same to a predetermined standard; and means responsive to said weight monitoring means for prematurely activating said take-away conveyor whenever the weight of the slices received by said receiving means deviates from said predetermined standard by a predetermined amount.

2. A slicing system according to claim 1 wherein said slice receiving means comprises a platform having a plurality of tines; said weight monitoring means is operatively connected to said platform to monitor the weight of slices received thereon and said take-away conveyor includes at least two spaced take-away belts, a means for driving the belts, and means for positioning the belts between the tines to engage slices received on said platform whereby movement of the belts by the drive means will remove the slices from the platform.

3. In a slicing system including a knife for cutting slices from one end of a length of material to be fed into a cutting zone, a feeding means for feeding material into the cutting zone to be sliced by the knife, a means for receiving slices cut from the length of material by the knife, an intermittently operable take-away conveying means adapted to be operated to remove cut slices from the receiving means, and a slice counting means operable to actuate the take-away conveyor after a predetermined number of slices have been cut, the improvement which comprises: means for determining the weight of the slices received by said slice receiving means and for providing a signal representative thereof; means for generating a signal representative of a desired weight of slices then cut; and means responsive to a difference between the two signals exceeding a predetermined difference to prematurely energize said take-away conveyor to thereby remove the slices from the slice receiving means.

4. A slicing system according to claim 3 wherein said last-named means comprises a pair of differential amplifiers, each receiving both of said signals, one of said differential amplifiers being responsive to a predetermined underweight condition for operating said take-away conveyor and the other being operative in response to a predetermined overweight condition for operating said take-away conveyor.

5. A slicing system according to claim 3 further including means defining an acceptance station; means defining a rejection station; and means responsive to the premature operation of said take-away conveyor for directing slices removed from said slice receiving means to said rejection station.

6. In a food slicing system including a knife for cutting slices from one end of a length of food material to be fed into a cutting zone, a feeding means for feeding food material into the cutting zone to be sliced by the knife, a means for receiving slices cut from the length of food material by the knife, an intermittently operable take-away conveying means adapted to remove cut slices from the receiving means, and a slice counting means operable to actuate the take-away conveyor after a predetermined number of slices have been cut, the improvement which comprises: means for determining the weight of the slices received by said slice receiving means and for providing a signal based thereon; means for generating a signal based on the desired weight of slices to be cut; and means responsive to a difference between said signals exceeding a predetermined difference to prematurely energize said take-away conveyor to thereby remove the slices from the slice receiving means.

7. In a slicing system including a knife for cutting slices from one end of a length of material to be fed into a cutting zone, a feeding means for feeding material into the cutting zone to be sliced by the knife, a means for receiving slices cut from the length of material by the knife, intermittently operable take-away conveying means adapted to be operated to remove cut slices from the receiving means, and a slice counting means operable to actuate the take-away conveyor after a predetermined number of slices have been cut, the improvement which comprises: means for continuously monitoring the weight of the slices received by said receiving means and for comparing a characteristic of the same to a predetermined standard; means responsive to said weight monitoring means for prematurely activating said take-away conveyor whenever the characteristic of the weight of the slices received by said receiving means deviates from said predetermined standard by a predetermined amount; means for counting the number of premature actuations of said take-away conveyor by said activating means; and means responsive to said counting means for issuing a warning whenever a predetermined number of premature activations of said take-away conveyor have occurred in a predetermined period of time.

8. The slicing system of claim 7 wherein said means for issuing a warning comprises a warning device.

9. A slicing system according to claim 7 wherein said means for issuing a warning comprises a means for shutting down the slicing system.

10. The slicing system of claim 7 wherein said means for issuing a warning is operative when a predetermined count of successive premature activations of said take-away conveyor have occurred; and further including a means for resetting said last named counter whenever said take-away conveyor is operated normally by said slice counting means.

* * * * *